United States Patent [19]

Namiki

[11] 4,365,277
[45] Dec. 21, 1982

[54] DEVICE FOR DETECTING THE POSITION OF A TAPE IN A MAGNETIC TAPE RECORDING AND/OR REPRODUCING APPARATUS

[75] Inventor: Yasuomi Namiki, Yokohama, Japan

[73] Assignee: Victor Company of Japan, Ltd., Yokohama, Japan

[21] Appl. No.: 106,883

[22] Filed: Dec. 27, 1979

[30] Foreign Application Priority Data

Dec. 28, 1978 [JP] Japan .............................. 53-163752

[51] Int. Cl.³ ...................... G11B 15/60; G11B 15/43; G11B 15/44; G11B 15/52
[52] U.S. Cl. .................................... 360/72.1; 360/85; 360/130.21
[58] Field of Search .................... 360/72.1, 72.2, 74.1, 360/74.4, 95, 70, 130.2, 130.21, 130.22, 130.23, 84–85, 137, 93

[56] References Cited

U.S. PATENT DOCUMENTS

| | | | |
|---|---|---|---|
| 2,912,516 | 11/1959 | Hallmann | 360/130.21 |
| 3,345,457 | 10/1967 | Macleod | 360/84 |
| 3,541,270 | 11/1970 | Joslow et al. | 360/72.1 |
| 3,673,348 | 6/1972 | Larkin | 360/85 |
| 3,947,880 | 3/1976 | Backers et al. | 360/70 |
| 4,012,788 | 3/1977 | Blanding | 360/130.23 |
| 4,014,039 | 3/1977 | Yasunaga | 360/72.1 |
| 4,118,602 | 10/1978 | Jacobson | 360/137 |
| 4,139,871 | 2/1979 | Yoshida et al. | 360/70 |

*Primary Examiner*—Alfred H. Eddleman
*Attorney, Agent, or Firm*—Louis Bernat

[57] ABSTRACT

A device for detecting the position of a tape in a magnetic tape recording and/or reproducing apparatus comprises a tape guide making contact with a magnetic tape traveling along a specific tape travel path at the side thereof opposite to the side having a magnetic layer surface thereon, a detection head provided in the tape guide at the front side thereof for producing a tape position designation signal on the magnetic tape from the side opposite to the side having the magnetic layer, and a circuit for detecting a desired position of the magnetic tape responsive to detection of the designation signal by the detection head.

8 Claims, 9 Drawing Figures

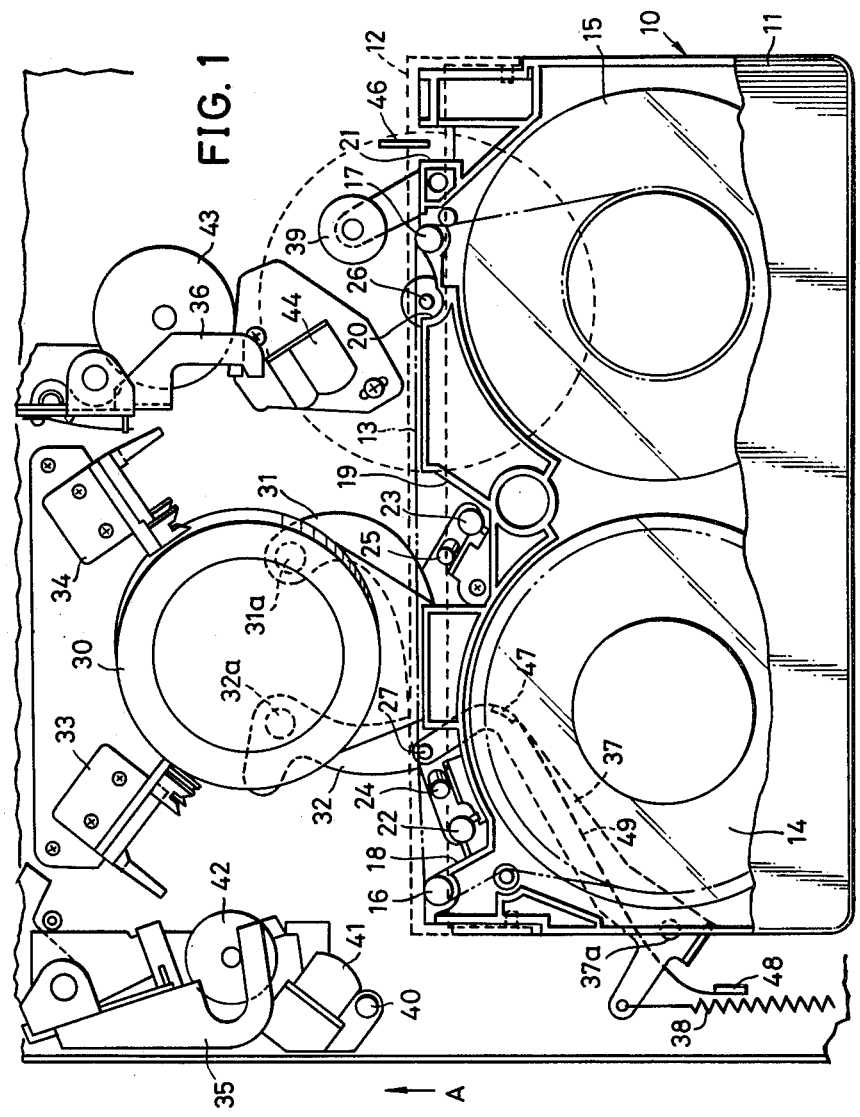

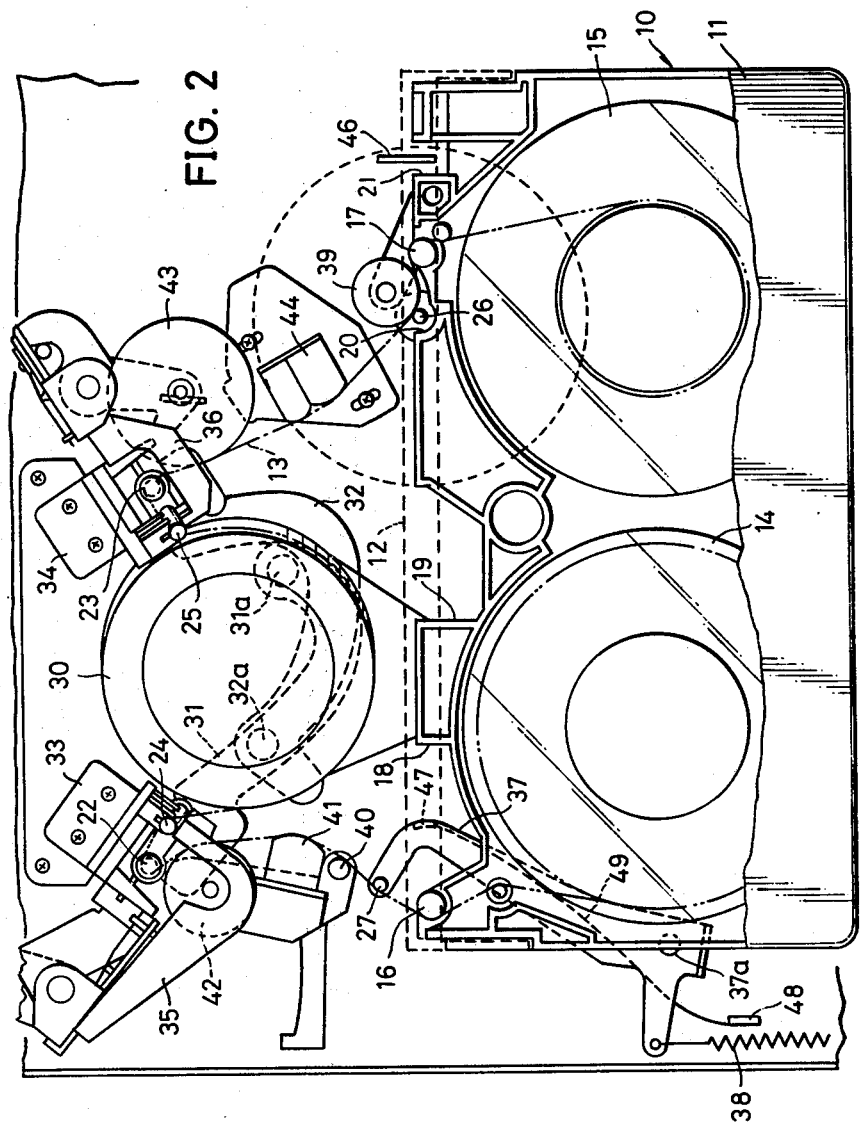

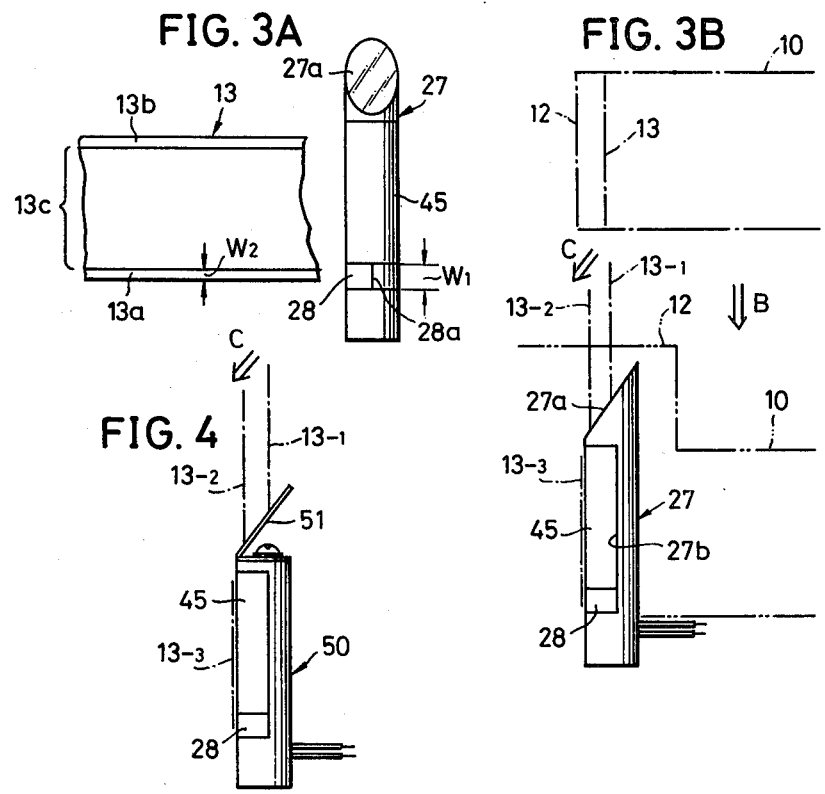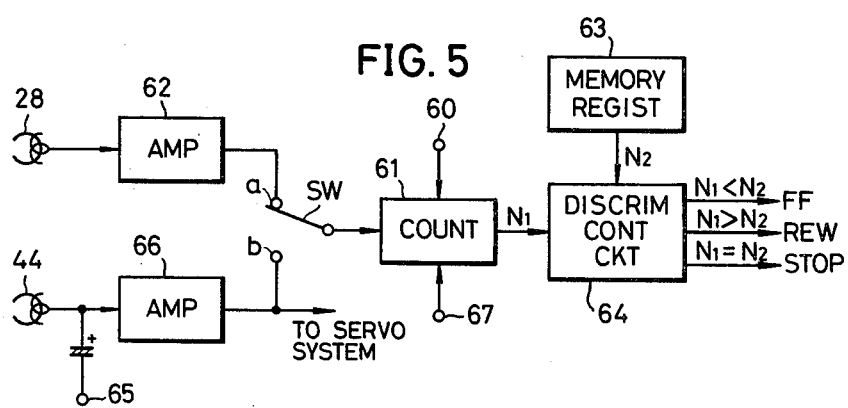

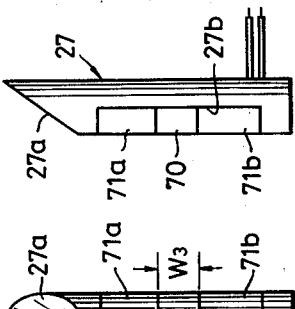
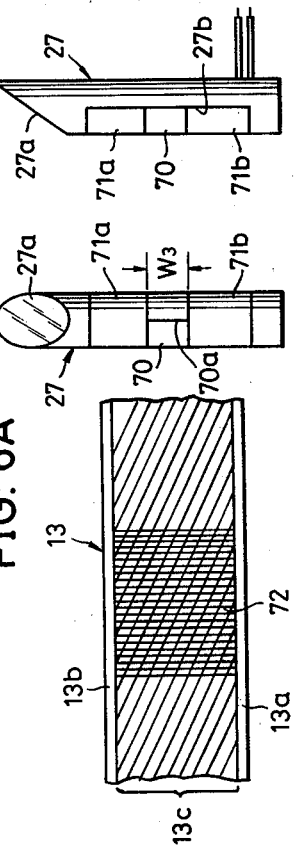
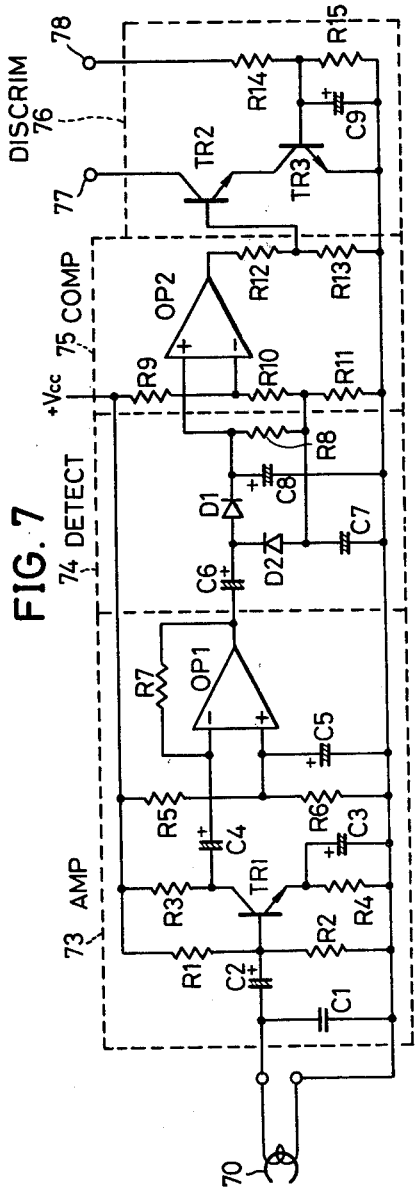

DEVICE FOR DETECTING THE POSITION OF A TAPE IN A MAGNETIC TAPE RECORDING AND/OR REPRODUCING APPARATUS

BACKGROUND OF THE INVENTION

The present invention relates generally to a device for detecting the position of a tape, and more particularly to a device in which a tape guide kept in contact with the reverse side of a magnetic tape (i.e., the side opposite to that having the magnetic layer) is provided with a head for detecting the tape position, which head detects a desired position on the tape from the reverse side thereof.

Some cassette type VTR (video tape recorder) apparatuses known heretofore have incorporated a tape position detection device, which is adapted to reproduce control pulse signals or the like from a tape traveling at high speed and to count the reproduced pulse signals, thereby to detect a desired position on the tape with respect to a reference position on the tape. Heretofore, tape position detection devices have been of two types according their general construction:

1. A device in which fast-forwarding and rewinding operations are carried out with the tape loaded in the same manner as in the recording and reproducing mode operations, and a control head is provided to reproduce the control pulse signals.

2. A device in which the tape is caused to travel at high speeds in a half-loaded state where the tape does not contact with the drum of the VTR but contacts with a control head which operates to reproduce control pulses.

However, in both the devices 1 and 2, the control head makes contact with the surface of the tape having the magnetic layer and this gives rise to a difficulty in that the magnetic layer of the tape is apt to be damaged when the tape position detection operation is carried out. In the device 1, the tape travels at high speeds along a rather complicated tape path while remaining in contact with the video heads and this gives rise to difficulties in that an excessive force is applied to the tape and in that the video heads are easily worn out and damaged. The latter device 2 needs a complicated mechanism for setting the tape in the half-loaded condition.

SUMMARY OF THE INVENTION

Accordingly, it is a general object of the present invention to provide a novel and useful device for detecting the position of a tape which overcomes the above described difficulties.

Another and specific object of the present invention to provide a tape position detection device in which a head for detecting tape position is mounted on a tape guide which enters into a tape cassette when the cassette is placed in its loaded position so as to bring the head into contact with the reverse side of a magnetic tape inside the cassette thus permitting the head to pick up a signal from the tape and detect a desired position on the tape. According to this invention, the fast-forwarding and rewinding mode operations for detecting tape position at the time of random-access operation are carried out without fear of damage to the magnetic layer of the tape and further in a state where the tape is accommodated within the cassette.

VTR cassettes have been standardized and it is therefore impossible as a practical matter to modify their shape. In view of this restriction on cassette shape, additional provision of a detection head or a tape guide having the detection head fixed thereon is impossible for lack of space. According to the present invention, since the detection head is embedded in a conventionally provided tension pole, no problem of space arises.

Still another object of the invention is to provide a device which detects the position of a tape by reproducing control pulses which have been recorded essentially for use in tape travel speed control or the like with a detection head provided in a tape guide contacting the reverse side of the tape and then by counting the control pulses thus reproduced.

A further object of the present invention is to provide a device which detects the position of a tape by picking up a cue signal which has been recorded at a specific position such as at the beginning end of the tape with a detection head provided in a tape guide contacting the tape at the reverse side thereof.

Further objects and features of the invention will be apparent from the following detailed description with respect to preferred embodiments of the invention when read in conjunction with the accompanying drawings, briefly described below.

BRIEF DESCRIPTION OF THE DRAWINGS

In the drawings

FIG. 1 is a plan view of a cassette type magnetic tape recording and/or reproducing apparatus to which one embodiment of a detection device of the invention is applied, with the apparatus shown in stop mode and fast-forwarding or rewinding mode;

FIG. 2 is a plan view showing the cassette type magnetic tape recording and/or reproducing apparatus illustrated in FIG. 1, in recording and/or reproducing mode;

FIGS. 3A and 3B are enlarged front and side views respectively showing one embodiment of a tension pole and a detection head, both of which constitute essential parts of the present invention, in relation to an associated magnetic tape;

FIG. 4 is a side view showing a modification of the tension pole provided with the detection head;

FIG. 5 is a block diagram showing one embodiment of a circuit which cooperates with the detection head shown in FIG. 3A;

FIGS. 6A and 6B are enlarged front and side views respectively, showing another embodiment of a tension pole and a detection head, both of which constitute essential parts of the invention, in relation to an associated magnetic tape; and FIG. 7 is a circuit diagram showing one example of a program start position searching circuit which cooperates with the detection head in FIG. 6A.

DETAILED DESCRIPTION

A cassette type magnetic tape recording and/or reproducing apparatus to which a tape position detection device according to the present invention is applied has a construction as shown in FIGS. 1 and 2. Fast-forwarding and rewinding mode operations are carried out with the magnetic tape accommodated within the cassette as illustrated in FIG. 1, and recording and reproducing mode operations with the magnetic tape drawn out of the cassette to form a specific traveling path.

The tape cassette 10 has an outer housing structure comprising a cassette case 11 and a lid 12. The lid is freely openable and closable on the front face of the case 11. The cassette case 11 accommodates therewithin, a freely rotatable tape supply reel 14 and a tape takeup reel 15 each for winding magnetic tape 13.

Guide poles 16 and 17 guide a tape 13 along the inner side of the lid 12 between the supply reel 14 and the takeup reel 15. The magnetic surface of the tape 13 faces outwardly from the front of the cassette 10. On the front side of the cassette case 11 are formed recesses 18, 19, 20 and 21.

As the cassette 10 is lowered into its operational position up-right guide rollers 22 and 23 and inclined guide poles 24 and 25 enter into the recesses 18 and 19 respectively, and a capstan 26 enters into the recess 20. A tension pole 27 is disposed on a tension arm 37 and when it enters into the recess 18 it pushes the tape 13 somewhat in the direction indicated by the arrow A in FIG. 1, as will be described further below. The tension pole 27 has a detection head 28 incorporated therein as indicated in FIGS. 3A and 3B. When the cassette 10 has been placed in its operational position, the detection head 28 makes firm contact with the reverse surface of the magnetic tape 13 at its control track 13a.

In recording/reproducing apparatuses known heretofore, the tension pole is positioned on the tension arm so not to make contact with the magnetic tape when the cassette is in loaded position. On the other hand, in the device of the present invention, the tension pole 27 is disposed on the tension arm 37 at a position shifted somewhat forwardly with respect to the conventional position, which enables the tension pole 27 to make positive contact with the magnetic tape 13.

When the recording and/or reproducing apparatus is placed in the recording or reproducing mode of operation, the upper drum of a guide drum 30 having video heads begins to rotate. At the same time, a pair of loading arms 31 and 32 rotate clockwise and counterclockwise respectively about shafts 31a and 32a. The inclined guide poles 24 and 25 are clamped between stop members 33 and 34 and clamp arms 35 and 36. The magnetic tape 13 wraps around part of the guide drum 30. A pinch roller 39 presses the magnetic tape 13 against the capstan 26. The magnetic tape 13 thus clamped by the capstan 26 and the pinch roller 39 is driven by the rotation thereof.

The tension arm 37 is turned counterclockwise about a shaft 37a responsive to the tensile force of a spring 38. The tension pole 27 moves out of the cassette 10 and again makes contact with the magnetic tape 13 outside the cassette 10. In this state, the detection head 28 provided on the tension pole 27 makes contact with the reverse surface of the magnetic tape 13 so as to be capable of reproducing signals recorded on the magnetic layer on the other side of the tape.

When automatic tape loading has been completed as indicated in FIG. 2, the tape 13 is drawn from the supply reel 14 past tension pole 27, and passed over a guide pole 40, and a full-width erasing head 41. Thereafter, it comes into contact with an impedance roller 42. The height position of the tape 13 is determined by the guide roller 22. The tape 13 is further guided and changed in direction by the guide pole 24. The tape 13 is held in wrapping helical contact around the guide drum 30. While the tape 13 is thus held in wrapping contact, a video signal is recorded or reproduced by rotating video heads on or from the magnetic tape.

After leaving the guide drum 30, the tape 13 is guided, positioned, and changed in direction by the guide pole 25 and the guide roller 23. Then, after contacting an impedance roller 43, the tape 13 contacts an audio and control signal recording and reproducing head 44. The tape 13 is thereafter clamped between and driven by the pinch roller 39 and the capstan 26. Then, it enters the cassette 10 and is wound on the take-up reel 15.

Next, a description is given of the construction of the tension pole 27 and the detection head 28 both of which constitute the essential part of the device of the present invention, in further reference to FIGS. 3A and 3B.

Among the poles and rollers which are fitted into the recesses 18 and 19 when the cassette is loaded into the recording and/or reproducing apparatus, the up-right guide rollers 22 and 23 and the inclined guide poles 24 and 25 serve to determine the height position of the tape. These poles and rollers thus require high accuracy in positional arrangement. On the other hand, the tension pole 27 is merely brought into contact with the tape in order to detect tape tension. This means that the location of the tension pole 27 can be chosen with some degree of freedom. Considering this, in the present embodiment of the invention, the detection head 28 is accommodated within the tension pole 27.

The lower end of the column-shaped tension pole 27 is embedded in the tension arm 37 at a position somewhat displaced toward the free end thereof, that is, in the direction of the arrow A (FIG. 1) from the conventional position. The tension pole 27 has a top surface 27a sloped downward toward the front side of the cassette, as indicated in FIGS. 3A and 3B. The tension pole 27 further has a recess 27b on its side facing away from the front side of the cassette, that is, on the side facing the magnetic tape 13. The recess 27b accommodates the detection head 28 having a gap 28a for reproducing signals and a dummy head 45 having no gap. The height of the detection head 28 is such that it opposes the reverse surface of the magnetic tape 13 at a position corresponding to the control track 13a. To make allowance for displacement of the tape 13 in the tape width direction when it travels, the detection head 28 is given a track width W1 which is larger than the width W2 of the control track 13a.

The dummy head 45 is made of a block material which has the same hardness and wear resisting property as the detection head 28, and is disposed to confront the reverse surface of the magnetic tape 13 at a position corresponding to an audio track 13b and a video track 13c. Accordingly, the detection head 28 and the dummy head 45 wear down equally under the abrasion of the traveling the tape 13 travels so that the contact state of the tape 13 on the detection head 28 is kept stable over a long period.

Both the detection head 28 and the dummy head 45 have cylindrical surfaces matching that of the tension pole 27 so that they also operate as tension poles and guide the magnetic tape smoothly.

When the cassette 10 is lowered in the direction indicated by arrow B in FIG. 3B to the operational position, the magnetic tape 13 spanning the front side of the cassette 10 comes into contact with the inclined surface 27a of the tension pole 27. The tape 13 is guided at a lower lateral edge thereof by the inclined top surface 27a and is thus displaced forward as indicated by arrow C. The displacement of the tape is designated by reference numerals 13-1 and 13-2. Finally, the reverse surface of the tape 13 makes contact with the tension pole 27, the detection head 28 and the dummy head 45, as denoted by a reference numeral 13-3. As a result, when the tape 13 is caused to travel inside the cassette 10, the tape 13 in its front span between the guide poles 16 and 17 makes positive contact with the tension pole 27, the detection head 28 and the dummy head 45, as illustrated in FIG. 1.

The tension pole 27 has a top height higher than the conventional tension pole. However, since the lid 12 engages a lug 46 (FIGS. 1 and 2) and opens, as indicated by two-dot chain lines in FIB. 3B, together with the downward movement of the cassette, the top of the tension pole 27 enters inside of the opened lid 12 and does not abut against the cassette 10.

A flexible printed band 49 extends loosely between a lug member 47 near the free end of the tension arm 37 and another lug member 48 on the chassis near the shaft 37a. The printed band 49 is constituted of a flexible insulative film with electrically conductive leads printed thereon. The output of the detection head 28 is led out by way of the printed band 49. The flexibility of the printed band 49 permits the tension arm 37 to resolve freely.

Another embodiment of the tension pole is illustrated in FIG. 4. In the same figure, those parts which are the same as corresponding parts in FIGS. 3A and 3B are designated by like reference numerals.

A tension pole 50 has the same height dimension as a conventional one and has the detection head 28 and the dummy head 45 fitted therein at the front side thereof. On the top of the tension pole 50 is screwed an inclined guide plate 51, which descends toward the front side of the cassette. This inclined guide plate 51 functions in the same manner as the above described inclined surface 27a; that is, it guides the tape 13 to bring it into contact with the detection head 28 when the cassette 10 is loaded in the recording and/or reproducing apparatus.

Next, a description will be given of the operation of detecting a desired position on the tape, with reference to FIG. 5. In particular, a random access operation, that is, an operation for detecting the position of the tape running at high speeds, is described.

Fast-forwarding and rewinding operations are performed with the tape 13 accommodated within the cassette 10, as indicated in FIG. 1. Preceding the random access operation, the operator pushes a reset button (not shown) to apply a reset signal through a terminal 60 to reset a counter 61. The part (position) of the magnetic tape 13 in contact with the detection head 28 at this time becomes a reference point. As the reference point, either the beginning end of the tape 13 or the start of a program recorded on the tape 13 is generally selected. The counter 61 is, for example, of an actual time display type for displaying one second every 30th frame.

Following this, the recording/reproducing apparatus is set to the recording/reproducing mode as illustrated in FIG. 2. The tape travels and signals are recorded on or reproduced from the tape. As the tape travels, the detection head 28 reproduces the control signals. Here, since the detection head 28 is in contact with the reverse side of the magnetic tape 13 (the side opposite to that having the magnetic layer), there occurs an inevitable spacing loss due to the thickness of tape base. However, the thickness of the tape base is on the order of 15 μm, which is thin enough to allow reproduction. The thinness of the tape coupled with the lower frequency and square waveform of the control signal allows the detection head 28 to normally reproduce the control signal in the form of a pulse signal.

The control pulse signal thus reproduced is amplified in an amplifier 62 and then passed through a switch SW with its moving contact connected to its contact point a, and is thereafter applied to the counter 61 where it is counted. The counter 61 indicates and produces an actual time signal N1 which corresponds to the position of the part of the tape in contact with the detection head 28 with respect to the above-mentioned reference point. The tape traveling speed when the tape starts stops is relatively low so that the level of the reproduced control pulse is correspondingly low. In this connection, the counter 61 has a trigger level set low enough to prevent occurrence of miss-counting.

When the apparatus is switched to stop mode during operation in recording/reproducing mode, all the magnetic tape 13 in the specific travel path outside the cassette 10 is returned to and accommodated within the cassette 10, and the magnetic recording/reproducing apparatus assumes the original state indicated in FIG. 1.

Moreover, preceding the random access operation, the operator sets the actual time N2 corresponding to the desired tape position, which actual time N2 is memorized in a memory register 63.

For random access operation, a search button (not shown) is pushed. Responsive to this pushing operation, a discrimination control circuit 64 is rendered operative and compares the counted value N1 from the counter 61 and the set value N2 from the memory register 63. When N1<N2, the discrimination control circuit 64 produces as output a fast-forwarding signal, which causes the fast-forwarding mechanism to operate automatically. Accordingly, the magnetic recording/reproducing apparatus operates in the fast-forwarding mode. While the tape 13 is traveling at high speeds in the normal direction within the cassette 10, the control signal reproduced by the detection head 28 is, as in the preceding case, applied to the counter 61 to be counted to increase the actual time counted value N1. When N1 becomes equal to N2 (N1=N2), the discrimination control circuit 64 outputs a stop signal which inactivates the fast-forwarding mechanism to stop the tape travel automatically.

Conversely, when N1>N2, the discrimination control circuit 64 produces outputs a rewinding signal, which causes the rewinding mechanism to operate automatically. Accordingly, the tape 13 travels at high speeds in the reverse direction within the cassette 10. At this time, the counter 61 receives a signal from a terminal 67 and thereby operates as a subtraction counter. The control signal reproduced by the detection head 28 is, as described above, supplied to the counter 61 where it is subtracted from the actual time counted value N1. When N1 becomes equal to N2 (N1=N2), the rewinding mechanism is rendered inoperative to stop tape travel.

As a consequence, the desired position of the tape 13 is detected while the tape 13 is traveling at high speeds and the tape 13 stops with the desired position confronting the detection head 28.

Alternatively, it may be arranged so that the pulse signal fed to the counter 61 at the time of recording/reproducing mode operations is obtained from the control head system. In this case, the movable contact of the switch SW is changed over to another contact point b.

In this modification, the control head 44 reproduces the control signal from the tape 13. The control signal thus reproduced is amplified in an amplifier 66 and thereafter is supplied both to a servo system and through the switch SW to the counter 61. There it is counted to detect and indicate the tape position. In the recording mode of operation, the control signal is applied to a terminal 65 and is then recorded on the magnetic tape by the control head 44.

A second embodiment of the detection device of the present invention is illustrated in FIGS. 6A, 6B and 7. This embodiment is capable of locating the start position of a program during fast-forwarding or rewinding operation within the cassette. In FIGS. 6A and 6B, those parts which are the same as corresponding parts in FIGS. 3A and 3B are designated by like reference numerals. The description of these parts will not be repeated.

Inside the recess 27b of the tension pole 27 are fitted a detection head 70 (W3=4 mm) at center and dummy heads 71a and 71b above and below the detection head 70. The detection head 70 has a gap 70a, and the dummy heads 71a and 71b have no gaps. A cue signal 72 has been recorded on the tape 13 over full width thereof at the start of a specific program. At the time the recording operation is started, the cue signal 72 is recorded by applying erasing current to the full-width erasing head 41.

In fast-forwarding or rewinding mode operation, the detection head 70 contacts the reverse surface of the magnetic tape 13 traveling at high speeds within the cassette 10, as indicated in FIG. 1. When the cue signal 72 is detected and reproduced by the detection head 70, the magnetic recording/reproducing apparatus is rendered inoperative to stop tape travel.

FIG. 7 shows a circuit for reliably reproducing the cue signal 72 by the detection head 70 in contact with the reverse surface of the tape 13. In an arrangement where the detection head 70 is in contact with the reverse surface of the magnetic tape 13, it is difficult in actual practice to obtain accurate azimuth adjustment. This reproducing circuit is so adapted that it does not perform erroneous detection operation even if some azimuth loss is present.

When the detection head 70 picks up the cue signal 72 in the rewinding mode operation, for example, the reproduced cue signal is amplified by an amplifier 73 which comprises resistors R1 through R7, capacitors C1 through C5, a transistor Tr1, and an operational amplifier OP1. The amplified signal is subjected to detection and rectification in a detection circuit 74 which comprises a resistor R8, a capacitors C6 through C8, and diodes D1 and D2, and is then applied to a comparator 75 composed of resistors R9 through R13 and an operational amplifier OP2. The comparator 75 responsively produces an output a high (H) level signal. Accordingly, the transistor Tr2 in a discrimination circuit 76, which comprises resistors R14 and R15, a capacitor C9, and transistors TR2 and TR3, is rendered conductive, whereby a stop signal is issued through a terminal 77 to stop tape travel. During the rewinding and fast-forwarding mode operations, an H level signal is applied to a terminal 78.

The amplifier 73 has an amplification factor which is more than 10 dB over that required for normal amplification and has a clipped level of power supply voltage +Vcc, that is, it operates as a limiter amplifier. This arrangement eliminates any fluctuations in the level of the reproduced signal due to fluctuation in the azimuth of the detection head 70, whereby no consideration need be given to azimuth loss in practical application. This means that the troublesome azimuth adjusting operation can be eliminated.

Furthermore, in the detection circuit 74, the capacitance value of the capacitor C8 is selected to be as much as about 30 times that of the capacitor C6. Accordingly, the detection circuit 74 thereby produces as output a signal, in which the level, not the pulse width, undergoes change proportional to the number of incoming pulse signals.

Therefore, even when a noise pulse having large level due to the use of the limiter amplifier is introduced, the level of the output signal of the detection circuit 74 does not reach a specific value insofar as the number of pulses is small. Thus there is no danger of the tape travel being stopped responsive to an incoming noise pulse. Additionally, this detection circuit 74 produces an output a signal whose voltage is proportional to the number of the incoming pulses, irrespective of the tape traveling speed.

Further, this invention is not limited to these embodiments but various variations and modifications may be made without departing from the scope of the invention.

What is claimed is:

1. A device for detecting the position of a magnetic tape in a recording/reproducing apparatus including drawing out means for drawing the tape out from a tape cassette, the tape having a layer of magnetic material on a side facing outwardly from said cassette, said device comprising:

means for transporting said tape within said cassette during a fast forward or rewind mode, said tape being drawn outside said cassette by the drawing out means during operation in either a recording or reproducing mode;

tape guide pole means for making contact with a side of said tape which is opposite the side having the magnetic layer thereon, said tape guide pole means entering into the tape cassette when it is placed in an operational position, and for making contact with said opposite side of the tape;

tension arm means having said tape guide pole means thereon, said tension arm means being located at a first position where the tape guide pole means contacts the tape within the cassette during the fast forward or rewind mode and moving to a second position so that the tape guide pole means contacts the tape drawn out from the cassette during the recording or reproducing mode, said tape guide pole means acting as a tension pole when the tension arm means is at said second position; and detection heads embedded in a side of said tape guide pole means for making contact with said opposite side of said tape for detecting a tape position designating signal recorded on said magnetic layer, and said detection head being operative during said fast forward, rewind, recording and reproducing modes, said tape guide pole means having an inclined top guide part for guiding and directing said magnetic tape to make contact with the detection head when said cassette is placed in the operating position of said recording reproducing apparatus.

2. A detection device as claimed in claim 1 wherein said tape guide pole means enters into a tape cassette inward of said magnetic tape when said tape cassette is placed in operational position, said tape cassette accommodating therein the magnetic tape with the magnetic layer side thereof facing outward.

3. A detection device as claimed in claim 2 wherein said tape guide pole means has at the top thereof an inclined guide part for guiding said magnetic tape at the lower lateral edge thereof when said tape cassette is placed in operational position, said magnetic tape thereby being shifted forwardly in said tape cassette and brought into contact with the front surface of said tape guide pole means.

4. A detection device as claimed in claim 3 wherein said tape guide pole means is a tension pole which, when said magnetic tape assumes a specific tape travel path outside said tape cassette, moves out from said tape cassette to make contact with said magnetic tape outside said tape cassette for detecting tape tension.

5. A detection device as claimed in claim 1 wherein said detection head is disposed at a height position confronting a control track on said magnetic tape from the reverse surface thereof for reproducing a control signal which has been recorded on said control track.

6. A detection device as claimed in claim 1 wherein said magnetic tape has a cue signal recorded at a specific position over substantially its full width, and said detection head is disposed in said guide pole at a height position where it is capable of reproducing said cue signal from the reverse surface of said magnetic tape.

7. A detection device as claimed in claim 1 which further comprises at least one dummy head which is made of a material similar to that of said detection head and is disposed next to said detection head, said detection head and said at least one dummy head extending over the region of contact of the magnetic tape with said tape guide pole means.

8. A device for detecting the position of a magnetic tape in a recording/reproducing apparatus, said device comprising:

tape cassette means having a magnetic tape with a magnetic layer on a side facing outwardly from said cassette;

means for transporting said tape in a fast forward or rewind mode while said tape is within said cassette and for recording/reproducing while said tape is drawn outside said cassette;

tape guide means, effective regardless of whether the tape is within or outside of said tape cassette, having an inclined top guide part for guiding and directing said magnetic tape to the bottom of said tape guide means when said cassette is installed in said recording/reproducing apparatus;

said tape guide means making contact with a side of said tape which is opposite the side with the magnetic layer, the tape being guided by said tape guide means whenever the apparatus is operating;

detection means in a front side of said tape guide means for making contact with said opposite side of said tape and detecting a tape position designating signal recorded on said magnetic layer; and means responsive to an output of said detection head means for indicating when said tape position signal is detected on said tape.

* * * * *